R. T. SMITH.
VEHICLE WHEEL.
APPLICATION FILED DEC. 21, 1908.

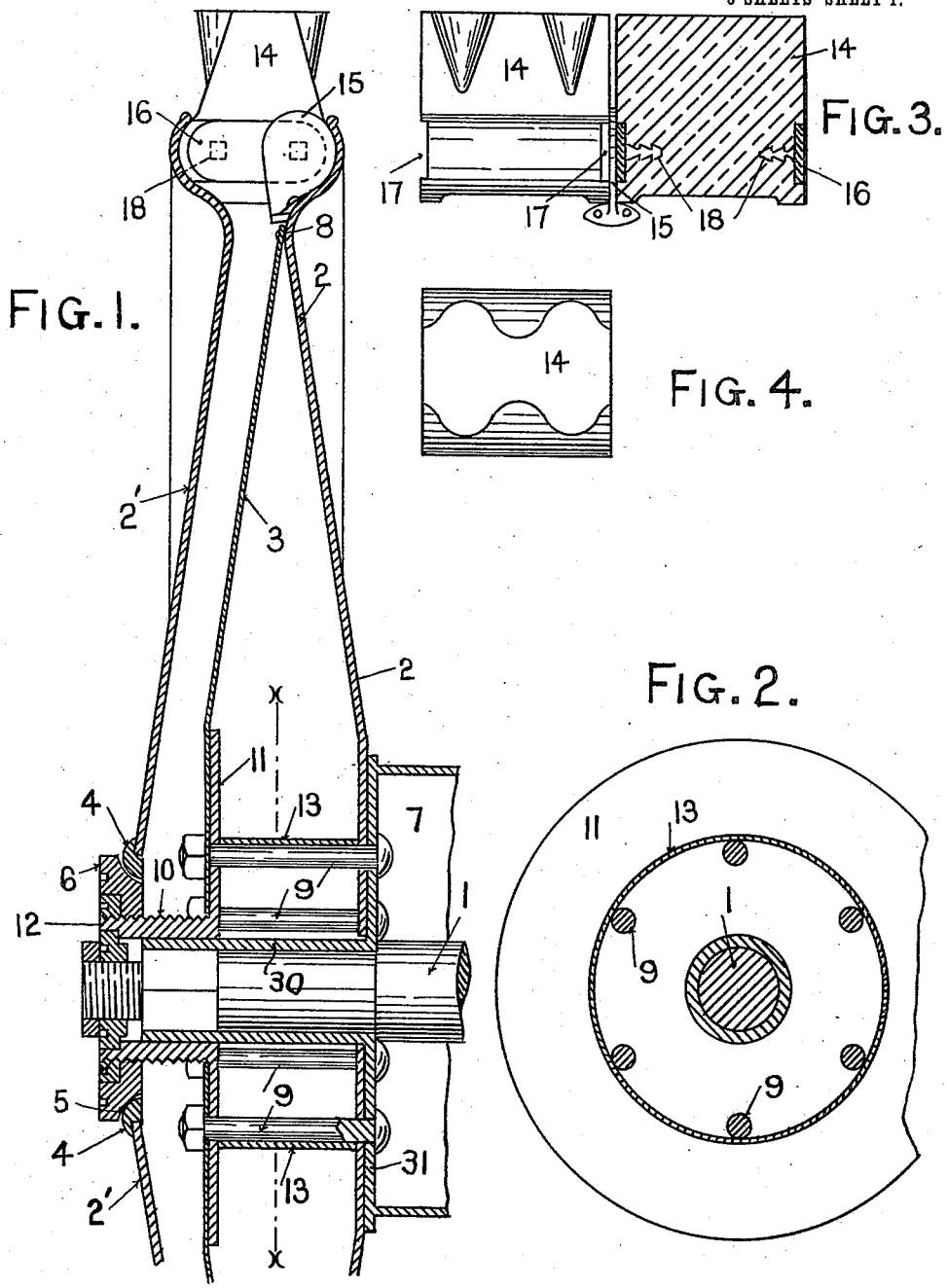

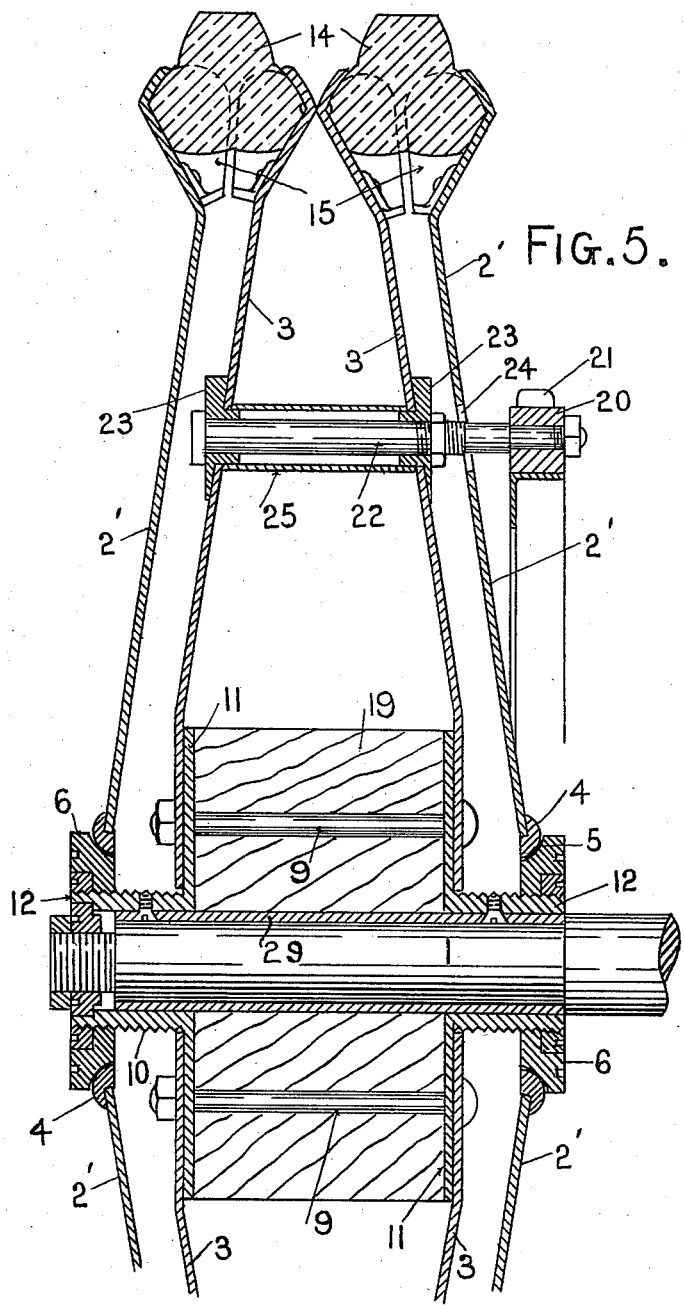

1,024,154.

Patented Apr. 23, 1912.

3 SHEETS—SHEET 3.

Witnesses
H. Williams
R. Boyd.

Inventor
Robert Thomas Smith.
per Chas. Coventry
attorney.

UNITED STATES PATENT OFFICE.

ROBERT THOMAS SMITH, OF WARRINGTON, ENGLAND.

VEHICLE-WHEEL.

1,024,154.  Specification of Letters Patent.  Patented Apr. 23, 1912.

Application filed December 21, 1908. Serial No. 468,555.

*To all whom it may concern:*

Be it known that I, ROBERT THOMAS SMITH, a subject of the King of Great Britain and Ireland, residing at 111 Lovely Lane, Warrington, in the county of Lancaster, England, hoop-roller, have invented a new and useful Improvement in Vehicle-Wheels, of which the following is a specification.

My invention relates to vehicle wheels and is specially applicable to certain types of wheels for power driven vehicles having either single or double treads. These types of wheels to which my invention relates and as hitherto constructed comprised (in wheels with single treads) two dished plates whose peripheries were trough shaped all around and gripped two edges of a triangular tire between them while the third edge formed the actual tread. The tire was made in short segments. The two plates were capable of a relative rocking motion when the tire between them was distorted by shock or pressure on the ground and the elasticity thus taken advantage of. In similar wheels having double treads there were four plates. In both cases the connection between the outside plates and the spindle was by means of a convex shaped ring on the disk bearing on a convex shaped bushing on the spindle.

My present invention has for its object to improve the construction of wheels of the above type as clearly set forth hereafter.

Figure 6:
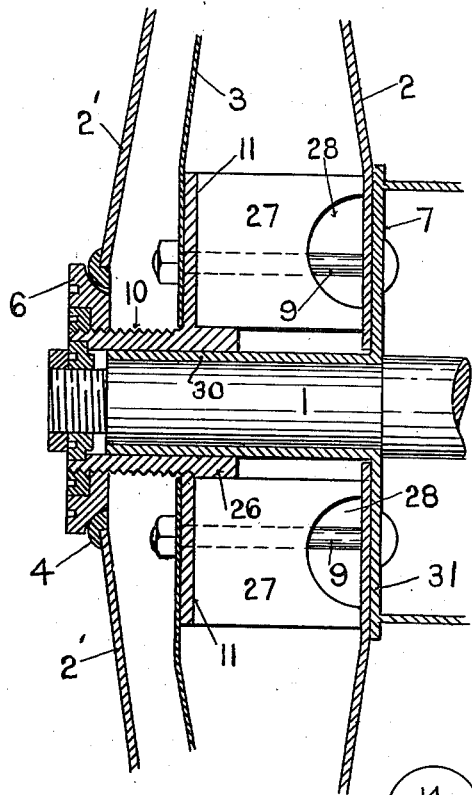
Figure 7:
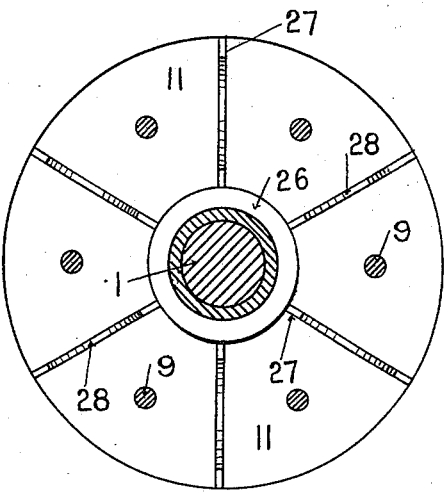
Figure 8:
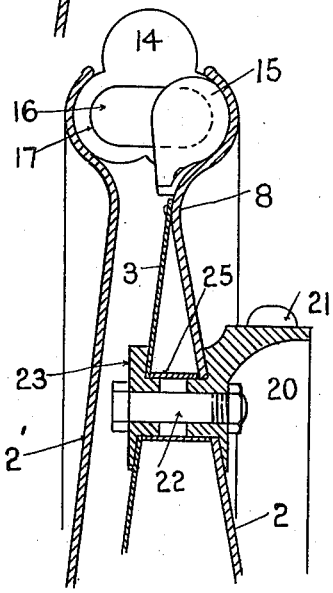

Referring to the accompanying drawings, Figure 1 is a vertical section through such portions of a wheel as suffice to explain my invention. Fig. 2 is a section of a portion of Fig. 1 taken as on line $x$—$x$. Fig. 3 is a side elevation partly in section corresponding with the upper portion of Fig. 1 and showing details connected with the blocks of rubber used to form the tread portion of the tire. Fig. 4 is a plan view of a portion of Fig. 3. Fig. 5 is a similar view to Fig. 1 but showing my invention as applied to a double tread wheel and showing also a modified form of distance-piece or packing which is used to build up the hub or nave. In this view also I show improved means for attaching a toothed chain ring to the side of the wheel. Fig. 6 is a similar view to Fig. 1 but showing a modified form of packing or distance piece to that shown in Fig. 5, and in this case it is shown applied to a wheel with a single tread. Fig. 7 is a section similar to Fig. 2. Fig. 8 is a detailed view of a portion of a single tread tire showing a modification in connection with the flanges or lugs to prevent the blocks or rubber creeping.

Different sections of tread are shown in the drawings and corresponding shapes of disk edges to hold them. It is to be understood that they are given as examples. The shape I prefer is that shown in Figs. 1, 3, and 4 but where it is desired to have the blocks reversible so that each lobe in succession may be used as the actual tread the shapes shown in the other figures may be employed. I do not claim these shapes as a part of my present invention.

Like reference numerals refer to corresponding parts in all the figures in which they occur.

1 shows the spindle on which the wheel is mounted. In Fig. 1 it has a squared portion and the wheel turns with it. In Figs. 5 and 6 it is shown plain and the wheel turns upon it. The ways of connecting to or mounting wheels on spindles of power driven vehicles vary considerably and are known to those skilled in the art to which my invention appertains.

2 and 2' represent the outside disks or plates which serve as spokes to the wheel and 3 the inner disks. In single tread wheels (see Figs. 1, 6, and 8) there is but one inner disk 3, but in double tread tires and (see Fig. 5) there are two.

Referring more particularly to Figs. 1 to 4, the central aperture in the outside disk 2' is reinforced by an externally convex ring 4 and this is carried in a concave groove 5 in a bushing 6. The bodily swing of the plate 2' about the joint so formed and which is caused by the lateral distortion of the tire by pressure on the ground or impact against obstacles is rendered smoother by having a groove 5 instead of, as has been hitherto tried, having a convex bearing surface for the ring 4, and in addition the parts are not so liable to bursting strains or to accidental relative displacement. 7 is a brake drum already well known. The inner disk 3 is riveted as at 8 (see also Fig. 8) near its periphery to the outside disk 2 while at the hub end it is firmly clamped to the brake drum 7 by bolts 9 which serve also to couple the wheel as a whole to said drum. It is to be understood that one very important feature of my invention is the ease with which my wheels may be applied to existing cars without materially altering their structure. 10 is a sleeve having a flange 11, and it is against this flange that the hub portion of the inner disk 3 is clamped by the bolts 9. It has an externally threaded nose 12 to receive the bushing 6. 13 is a ring or packing piece which is gripped between the brake drum and outer disk 2 on the one side and the inner disk 3 on the other side. A girder-like structure and extreme strength, lightness, and a good modulus of elasticity are thus provided. The blocks of rubber 14 are separated in all the examples shown in the drawings by flanges 15. These flanges are attached by riveting to the tread carrying disks 2'. In some cases for instance with an inferior quality of rubber or for very heavy traffic I provide protecting end plates 16 of metal, raw hide, or other suitable material. In Figs. 1 and 3 I show these as resting in slots or recesses 17 in the ends of the rubber blocks and they are assisted to remain in place by jags or toothed spikes 18 which are embedded in the rubber. In Fig. 8 these plates 16 are shown as merely resting in corresponding molded recesses 17 which have closed ends as distinguished from the slots 17 in Fig. 1 which extend right through from side to side.

Referring now more particularly to Fig. 5 which shows two treads or rows of rubber blocks 14, instead of using a metal ring or packing piece 13 as shown in Figs. 1 and 2 I employ an annular ring or blocks of wood 19 as an alternative. A bearing sleeve 29 is mounted on spindle 1 as shown in Fig. 5. The sleeves 10 are attached to this sleeve 29 and the sleeve thus serves to hold the various parts of the hub in operative relation. In Fig. 1 a sleeve 30 is mounted on the spindle 1 and provided with a flange 31 and the same construction is shown in Fig. 6. With the constructions thus set forth it is apparent that the wheels may be applied to existing vehicles without materially altering their structure. In large works where a variety of sizes of wheels are required to be fitted, and that often at short notice, this form of packing is of advantage as it may be very readily fitted and holes for the bolts 9 bored out in a hurry. There is not quite the same fine accuracy of fitting required with a wood packing as there is with a metal distance piece. Experimental practice has however proved that wood lasts a long time. 20 shows a chain wheel consisting of a metal ring having teeth 21. 22 is one of a series of bolts to fasten this in place. 23 are slanted washers to bear against the disks 3 and 24 is a hole in the right hand disk 2' in Fig. 5. In Fig. 8 the head of the bolt 22 bears in a similar manner against the thinner inner disk 3, and in this latter case there is no relative play between the plates thus coupled. 25 are distance pieces to hold the plates apart under the influence of the tightening action of the bolts 22.

Referring now more particularly to Fig. 8, it will be seen that the inside contour of the chain wheel 20 is shaped to correspond with the slant of the outside disk 2.

Referring to Figs. 6 and 7 the sleeve 10 is extended inward as shown at 26 and I provide webs 27 which serve as distance pieces instead of either the rings 13 Fig. 1 or wooden blocks 19 Fig. 5. They are preferably cored out as shown at 28.

An important feature of my invention is the flattening of the central portions of the disks or plates. In the spinning, rolling or other manufacture of dished disks and in the affixing them to existing hubs or originally building them up into wheels it is essential that the central parts shall be as true a fit as possible. I find that by making a flat on some of the dished disks or plates these uses of them are simplified and more easily standardized. Moreover when wheels constructed in accordance with my invention are to be substituted for other wheels already on existing vehicles and it is desired that they shall run in the original tracks of the old wheels, this flattening of the disks or some of them is a great advantage in the securing of proper alinement.

I claim:

1. A wheel comprising dished plates having channeled edges, rubber blocks gripped between said edges and forming the tread, said channeled edges forming the bearing and support of the tread and resisting any inward thrust of the tread, and a hub provided with means for holding one of said plates and permitting a swinging motion thereof.

2. In a disk wheel the combination of dished plates, a series of rubber blocks gripped between the edges of said plates, said plates forming the bearing and support for said blocks, annular spacing members rigid with said plates, and end plates carried by said blocks adapted to protect the blocks.

3. A wheel having dished plates provided with channeled edges, a tread gripped between said edges, a hub and a bushing carried thereby, and a ring carried by said bushing and engaging one of said plates for permitting a bodily swing of the same.

4. In a chain driven disk wheel the combination of tread and bracing dished plates, the tread dished plates having channeled rims integral therewith, blocks of rubber interposed between said rims to form the tread of the wheel, a hub and annular spacing members fixedly connected together and holding said plates at fixed distances, a chain ring for driving said wheel, bolts adapted to clamp said ring to two of said plates, and a sleeve on each bolt between the said two plates adapted to take up the thrust of said bolts, substantially as described and shown.

5. A wheel comprising dished plates having channeled edges, rubber blocks gripped in the channels of said edges and forming the tread of the wheel, said channeled edges forming the bearing and the sole support for said tread, and a hub provided with means engaging one of said plates and permitting a bodily swing of the same and for preventing the spreading of said plates at their edges.

6. A disk wheel comprising dished plates having channeled edges, rubber blocks gripped between said edges, end plates between said blocks riveted to said plates, and means for holding one of said dished plates rigidly.

7. A disk wheel comprising dished plates having channeled edges, a tread gripped in said channeled edges, a flanged sleeve attached to one of said plates, a second flanged sleeve, a bushing mounted on said second flanged sleeve and a ring carried by said bushing for holding one of said plates and permitting a bodily swing of the same, and spacing members in combination with said sleeves for holding said plates in fixed relation to each other.

8. A wheel comprising oppositely disposed plates having channeled edges, an elastic tread gripped between edges, said channeled edges forming the lateral bearing and inner support of the tread, and a hub provided with means to hold one of said plates and permitting a swinging motion thereof.

9. A wheel comprising oppositely disposed radially converging plates having channeled edges, an elastic tread comprising elastic blocks gripped between said edges, said channeled edges forming the lateral bearing and inner support of the tread, and a hub provided with means to hold one of said plates and permitting a swinging motion thereof.

10. A wheel comprising oppositely disposed outer plates having channeled edges, an elastic tread gripped between said edges, said channeled edges forming the lateral bearing and inner support of the tread, an inner bracing plate secured to one of the outer plates near its edge and secured in spaced relation therefrom adjacent the center, and a hub provided with means to hold the unbraced outer plate near its center and permitting a swinging motion thereof.

ROBERT THOMAS SMITH.

Witnesses:
 CHAS. COVENTRY,
 RUTH BOYD.

Copies of this patent may be obtained for five cents each, by addressing the "Commissioner of Patents, Washington, D. C."